United States Patent [19]
Matthews, Jr. et al.

[11] 3,764,097
[45] Oct. 9, 1973

[54] LIGHTWEIGHT, VARIABLE SOLIDITY KNITTED PARACHUTE FABRIC

[75] Inventors: Frederick R. Matthews, Jr., Poquoson; Erskine C. White, Newport News, both of Va.

[73] Assignee: The United States of America as represented by the National Aeronautics and Space Administration

[22] Filed: Dec. 23, 1971

[21] Appl. No.: 211,332

[52] U.S. Cl. .............................................. 244/145
[51] Int. Cl. .......................................... B64d 17/02
[58] Field of Search ............... 244/142, 145, 138 R; 66/169–170, 202, 198

[56] References Cited
UNITED STATES PATENTS

| | | |
|---|---|---|
| 3,529,794 | 9/1970 | Stahler et al. .................... 244/142 |
| 3,531,067 | 9/1970 | Mitchell ............................ 244/142 |
| 2,432,920 | 12/1947 | McKay et al. ..................... 244/142 |
| 3,252,676 | 5/1966 | Frieder ............................. 244/145 |
| 3,386,692 | 6/1968 | Schuerch .......................... 244/145 |

*Primary Examiner*—Duane A. Reger
*Assistant Examiner*—Jesus D. Sotelo
*Attorney*—Howard J. Osborn et al.

[57] ABSTRACT

A decelerator particularly adapted for high altitude, low atmospheric density operation includes a canopy constructed of a circular knitted fabric including ribbon-like yarns which are twisted to provide air deflection and hence, resultant drag. A radar reflective version of the fabric is preferably knitted of a combination of nylon filaments and metallized polyester tapes or ribbons which, in addition to serving in deflecting air, provide the desired reflectivity.

10 Claims, 4 Drawing Figures

Patented Oct. 9, 1973 3,764,097

DESIGN 1

| # | 0 | 0 | X | 0 | 0 | # | 0 | 0 | X | 0 | 0 | # | 0 | 0 | X |
|---|---|---|---|---|---|---|---|---|---|---|---|---|---|---|---|
| X | 0 | 0 | # | 0 | 0 | X | 0 | 0 | # | 0 | 0 | X | 0 | 0 | # |
| # | 0 | 0 | X | 0 | 0 | # | 0 | 0 | X | 0 | 0 | # | 0 | 0 | X |
| X | 0 | 0 | # | 0 | 0 | X | 0 | 0 | # | 0 | 0 | X | 0 | 0 | # |

DESIGN 2

| # | 0 | X | 0 | # | 0 | X | 0 | # | 0 | X | 0 | # | 0 | X |
|---|---|---|---|---|---|---|---|---|---|---|---|---|---|---|
| X | 0 | # | 0 | X | 0 | # | 0 | X | 0 | # | 0 | X | 0 | # |
| # | 0 | X | 0 | # | 0 | X | 0 | # | 0 | X | 0 | # | 0 | X |
| X | 0 | # | 0 | X | 0 | # | 0 | X | 0 | # | 0 | X | 0 | # |

INVENTORS
FREDERICK R. MATTHEWS, JR.
ERSKINE C. WHITE
BY
*Howard J. Osborn*
ATTORNEY

LIGHTWEIGHT, VARIABLE SOLIDITY KNITTED PARACHUTE FABRIC

ORIGIN OF THE INVENTION

The invention described herein was made by employees of the United States Government and may be manufactured and used by or for the Government for governmental purposes without the payment of any royalties thereon or therefor.

FIELD OF THE INVENTION

This invention is related to parachutes and like decelerators and to an improved support fabric for such decelerators.

BACKGROUND OF THE INVENTION

Aerodynamic deceleration devices or decelerators such as conventional canopy-type parachutes and balloons are generally limited to low altitudes. Such devices are generally fabricated of heavy materials having high solidity rates, that is, a low resistance to atmosphere, thus preventing their use at high altitudes and low atmospheric densities. Further, the rate of descent of such decelerators is not constant thus causing erroneous results in measurements in which they are used.

Substantial improvements in the amount of drag produced at high altitudes in rarified gases, and in the constancy of deceleration provided, have been obtained by the use of a parachute canopy in the form of an open mesh array of fibers or the like. Reference is made to U.S. Pat. No. 3,386,692 (Schuerch) for a further discussion of parachutes of this type as well as of the problems associated with providing a device which can generate a large aerodynamic drag at high altitudes and low atmospheric density.

Although the use of an open mesh fabric canopy has provided considerably promise, successful development of a workable high-altitude Stokes-flow decelerator has depended to a large extent on the availability of appropriate mesh structures. In order to maximize the benefits of the Stokes-flow principle of drag generation, the mesh structures should comply with requirements of minimum characteristic width of the filaments making up the mesh, minimum solidity of the mesh structure and minimum weight per unit area of mesh, although limitations on these requirements are dictated by the effects of rarified gas regarding the first requirement and by trade-off considerations involving parachute size versus solidity for payload-carrying parachutes, regarding the latter two. The availability of suitably fine meshes in quantities sufficient for use in such canopies has been severely limited by fabrication problems and although a number of techniques, such as gluing, punching, slicing, milling and weaving, have been considered, none of these has proved to be entirely satisfactory.

SUMMARY OF THE INVENTION

In accordance with the present invention a decelerator or parachute fabric is provided which is lighter in weight and has a greater solidity range than the materials of the prior art. The material is easy to package and when utilized in a deceleration device provides substantial drag at high altitude and low densities According to a presently preferred embodiment, the fabric of the invention is circular knitted and includes ribbon-like fibers which are twisted to provide air deflection. It has been found that circular knitting provides decided advantages regarding fabric openness, ease of preparation and processing, and the like, over techniques such as weaving as well as over other knitting techniques. The fabric is preferably radar reflective in which case the fabric is made from a combination of metallized polyester ribbons and synthetic plastic polymeric filaments knitted together. The solidity rate, as well as the radar reflectivity may be varied over a very wide range by varying the relative percentages of the metallized polyester ribbons and nylon filaments. The ribbons are preferably aluminized polyester tapes whereas the nylon filaments are preferably circular diameter nylon monofilaments.

Other features and advantages of the invention will be set forth in, or apparent from, the detailed description of preferred embodiments found hereinbelow.

DESCRIPTION OF THE PREFERRED EMBODIMENTS

Figures 1, 3A, 3B:
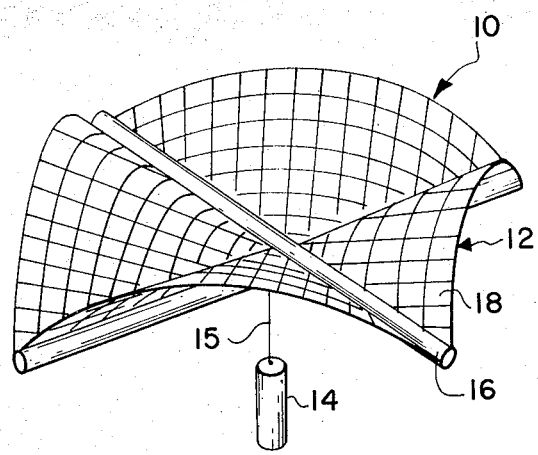
FIG. 1 is highly schematic perspective view of a decelerator incorporating the present invention.
FIGS. 3A and 3B are knitting pattern diagrams associated with the knitted fabric of FIG. 2.

Referring to FIG. 1, a decelerator or deceleration device, generally denoted 10, is shown. Decelerator 10 comprises an X-brace parachute 12 which supports a load 14 with a central suspension line 15 and includes an X-brace 16 and open-mesh parachute canopy 18 mounted thereon. The construction of parachute 12 is generally conventional apart from the canopy 18 described hereinbelow and a decelerator incorporating the invention can take a number of different forms including that of a simple collapsible canopy as well as those described in the above-mentioned U.S. Pat. No. 3,386,692.

Figure 2:
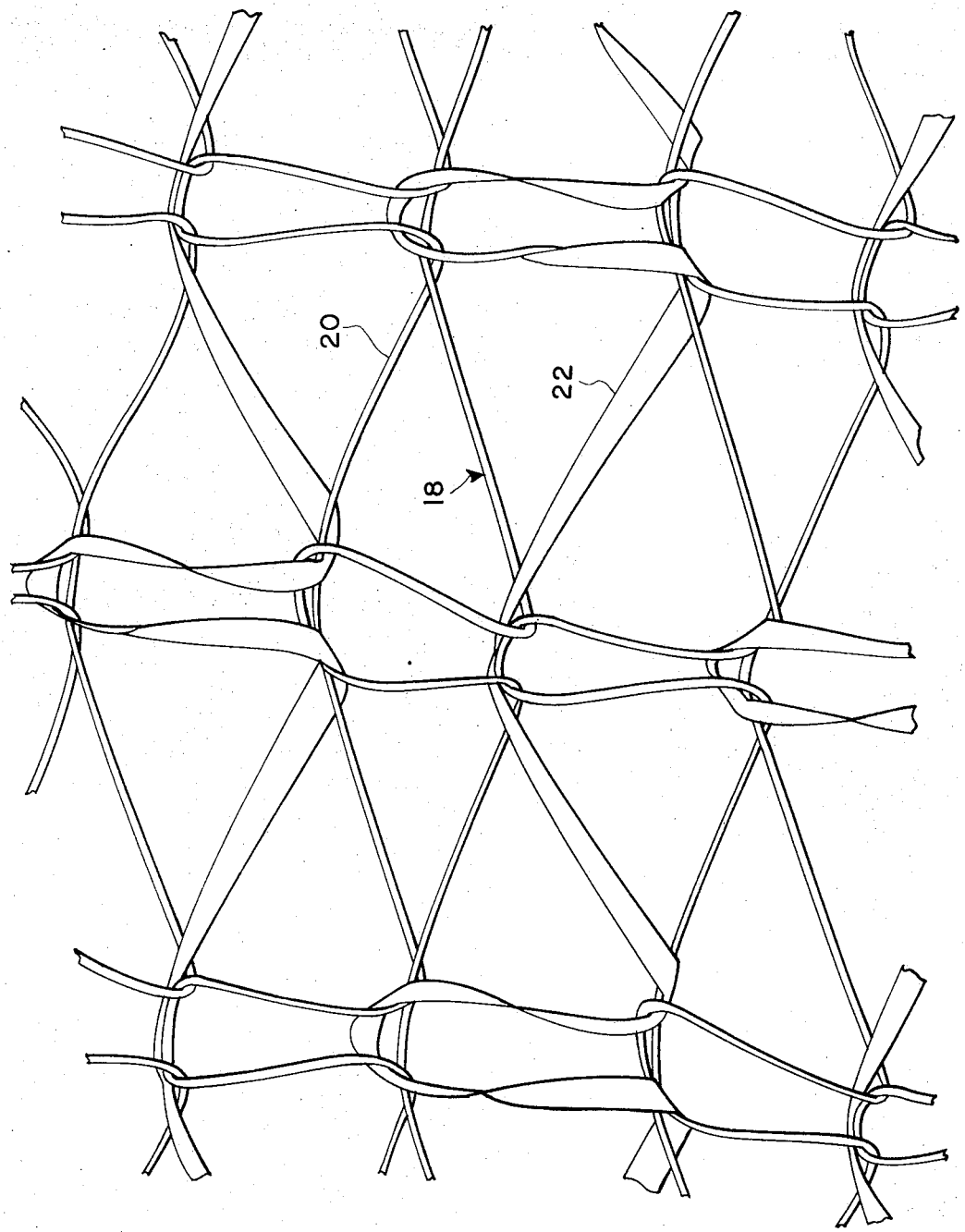
FIG. 2 is a plan view of the knitted canopy fabric of the deceleration of FIG. 1.

The parachute fabric used in canopy 18 is shown in more detail in FIG. 2. The fabric is preferably made from nylon monofilaments denoted 20 and aluminized polyester tapes, sold under the name of "Lurex TE100", denoted 22. In an exemplary embodiment the tapes 22 are approximately 0.00025 inch thick and approximately 0.010 inch wide and include an aluminum coating 400A. thick on both sides and a chemically resistant coating on top of the aluminum. The tapes are preferably reinforced by 15-denier nylon filaments wrapped around the tapes in opposite directions. It will be understood that the figures given are merely exemplary and it is noted that the ribbons can be relatively wide, with widths up to about 2 inches being contemplated. Similarly the filaments can be several mils in diameter.

The knitted fabric shown in FIG. 2 was circular knitted on a 32 feed, 18 cut Singer ROF latch needle machine with a cylinder diameter of 24 inches. The following table, Table I, provies the complete knitting machine specifications.

TABLE I

Model — Singer ROF
Cut — 18
Diameter of cylinder — 24 inches
Total number of needles — 1,380

Total number of feeds — 32
Speed — 20 rpm
Positive feed — IRO tape
Type needles — latch
Shims — 0.040
Take-down tension — minimum
Production rate — 40 to 50 yards/hour
Finished fabric width (open) — 65 inches A number of different canopy fabrics were knitted and are tabulated in Table II.

TABLE II

| Fabric Designation | Stitch | Uni-wave Setting | Positive Feed |
|---|---|---|---|
| A | Design 1 | 35–33 | Pulley — 6" Wheel — 95 |
| B | Design 1 | 35–33 | Same |
| C | Design 1 | 35–33 | Same |
| D | Design 1 | 35–33 | Same |
| E | Design 1 | 35–33 | Same |
| F | Design 1 | 35–33 | Same |
| G | Design 1 | 35–37 | Same |
| H | Design 2 | 35–37 | Same |

| Fabric Designation | Fiber Content | Yarn Arrangement For Knitting |
|---|---|---|
| A | 20/3 Semidull nylon 6 yarn 1/100 – inch supported C-25 metallic yarn | 3 feeds nylon – 1 feed metallic and repeat 8× |
| B | Same | 1 feed nylon – 1 feed metallic and repeat 16× |
| C | Same | 1 feed nylon 3 feeds metallic and repeat 8× |
| D | Same | 3 feeds nylon – 5 feeds metallic and repeat 4× |
| E | 100% 1/125-inch supported C-25 metallic yarn | All feeds supported metallic yarn |
| F | 20/3 Semidull nylon 6 yarn 1/100 – inch supported C-25 metallic yarn | 5 feeds nylon – 3 feeds metallic and repeat 4× |
| G | 100% 20/1 Semidull nylon 6 yarn | All feeds nylon |
| H | Same | All feeds nylon |

| Fabric Designation | Finished Fabric Weight (grams/square meter) | Light Transmission |
|---|---|---|
| A | 5.57 | 89% |
| B | 6.42 | 88% |
| C | 8.65 | 80% |
| D | 8.19 | 84% |
| E | 10.19 | 78% |
| F | 6.33 | 88% |
| G | 4.56 | |
| H | 7.35 | |

| Fabric Designation | Construction (Wales × Courses) |
|---|---|
| A | 7.5 × 10 |
| B | 7.5 × 9 |
| C | 7.5 × 9 |
| D | 7.5 × 10.5 |
| E | 8 × 8.5 |
| F | 8 × 9.5 |

The fabric of FIG. 2 is designated "A" in Table II and Designs 1 and 2 in Table II are indicated in FIGS. 3A and 3B wherein the symbol X indicates "knit", the symbol # indicates "tuck" and the symbol O indicates "welt" in accordance with conventional nomenclature. As shown in Table II, the finished fabrics range in weight from 5.6 to 10.2 grams per square meter and provide fabric openness values between 78 percent and 89 percent. Several different tests may be used to determine fabric "openness", including a light transmission test and although the results differ depending on the test, the values given are representative.

As discussed above, in accordance with one feature of the invention, the parachute canopy 18 is made radar reflective by including reflective yarns 22. To provide fabrics with varying reflective characteristics, a range of fabrics were knitted using different percentages of C–25 metallic yarn combined with 20/3 Nylon 6 using different feeds as shown in Table II.

To provide minimum weight and stabilization in cutting, the polyester nylon and nylon fabrics for the decelerator chutes were finished. Although short samples may be finished open width on a tenter frame, to stabilize circular knit goods at predetermined widths commercially, a stream calendar should be used. It is noted that with both techniques particular care must be taken to avoid rough edges from "picking" the delicate fabric and causing runs. In an exemplary finishing procedure for circular knit fabrics containing supported C–25 Lurex and 20/3 nylon 6 yarn, the fabric was framed and set on a Famatex unit at 350°F. for 30 seconds. The finished width was approximately 65 inches, as noted in Table I. The fabric could not be fed directly onto the frame and had to be clipped on by hand in short pieces, thus producing a large number of runs in the fabric because of the excessive handling required. For these reasons, as mentioned above, the use of a tenter frame for this particular fabric on a continuous basis would be most difficult. In a second example involving circular knit, non-reflective fabrics containing 100% 20/1 semidull nylon 6, the fabrics were first processed through a stream calendar at a tubular width of 34 inches. The fabrics were then autoclaved in a Turbo Model FS 1200 Autoclave, in order to stabilize the fabrics for metallizing. The autoclaving involved 1 minute of prevacuum, 5 minutes of steam at 250°F. and 5 minutes of port-vacuum. The autoclaving causes fabric shrinkage of about 30 percent.

Circular knitting provides a number of advantages as compared with other techniques which might be used in fabricating open mesh parachute canopies. For example, weaving of the mesh filaments is not practical because such an approach will not produce the desired fabric openness. Further, other knitting techniques, and, in particular, warp knitting techniques, have proved unsatisfactory for a number of reasons including the non-acceptability of the fabric produced because of the solidity and metal content as well as reasons involving processing difficulties.

As discussed above, the parachute canopy fabric of the invention provides a number of advantages as compared with prior art fabrics used for the same purposes. For example, the fabric is lighter in weight, has a greater solidity range and can be more compactly packaged. The use of ribbons of yarn which are woven such that the flat parts thereof are twisted as shown in FIG. 2, provides added air deflection as compared with circular diameter monofilaments and prevents the air from flowing directly through the fabric, thereby providing the necessary drag and, hence, deceleration.

Although the invention has been described in reference to exemplary embodiments thereof, those skilled in the art will understand that variations may be effected in these embodiments without departing from the scope and spirit of the invention.

What is claimed as new and desired to be secured by Letters Patent of the United States is:

1. In a decelerator comprising an open-mesh parachute support fabric and means for coupling said support fabric to a load, the improvement wherein said support fabric comprises an open-mesh knit fabric of high porosity including ribbons the flat portions of which are twisted to oppose air flow through the fabric and hence produce resultant drag.

2. A decelerator as claimed in claim 1 wherein said ribbons are fabricated of polyester film.

3. A decelerator as claimed in claim 1 wherein said support fabric includes radar reflective material.

4. A decelerator as claimed in claim 3 wherein said radar reflective material comprises metallic ribbons circular knitted into said fabric.

5. A decelerator as claimed in claim 4 wherein said metallic ribbons comprise aluminized polyester ribbons.

6. A decelerator as claimed in claim 5 wherein said fabric further comprises circular diameter nylon monofilaments.

7. A lightweight, variable solidity, radar reflective knitted parachute fabric comprising a circular knitted fabric knitted from synthetic plastic polymeric filaments and radar reflective ribbons, the flat parts of said ribbons being twisted to provide air deflection in use.

8. A parachute fabric as claimed in claim 7 wherein said radar reflective elements comprise polyester ribbons having a metallic coating thereon, and said metallic coating is aluminum.

9. A parachute fabric as claimed in claim 7 wherein said filaments comprise circular diameter nylon monofilaments.

10. A parachute fabric as claimed in claim 7 wherein the weight per unit area of the fabric is less than 15 grams per square meter and the percentage of light transmission therethrough is greater than 50 percent.

* * * * *